United States Patent
Fourie et al.

(10) Patent No.: US 10,696,371 B1
(45) Date of Patent: *Jun. 30, 2020

(54) METHOD FOR SEALING THE APEX OF A BALLOON DIRECTLY TO A RIGID PLATE

(71) Applicant: LOON LLC, Mountain View, CA (US)

(72) Inventors: Daniel Henry Fourie, Sunnyvale, CA (US); Kevin Roach, Boulder Creek, CA (US)

(73) Assignee: Loon LLC, Mountain View, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/834,515

(22) Filed: Dec. 7, 2017

Related U.S. Application Data

(63) Continuation of application No. 14/954,107, filed on Nov. 30, 2015, now Pat. No. 9,908,607.

(51) Int. Cl.
*B64B 1/40* (2006.01)
*B64F 5/40* (2017.01)
*B64F 5/10* (2017.01)
*B64B 1/58* (2006.01)

(52) U.S. Cl.
CPC .................. *B64B 1/40* (2013.01); *B64B 1/58* (2013.01); *B64F 5/10* (2017.01); *B64F 5/40* (2017.01)

(58) Field of Classification Search
None
See application file for complete search history.

(56) References Cited

U.S. PATENT DOCUMENTS

| | | | |
|---|---|---|---|
| 2,779,554 A | 1/1957 | Kizzek | |
| 2,919,082 A | 12/1959 | Winzen et al. | |
| 4,463,513 A * | 8/1984 | Wallace | A63H 27/10 446/222 |
| 4,705,235 A | 11/1987 | Regipa | |
| 9,027,877 B1 | 5/2015 | Brookes | |
| 2005/0054262 A1 * | 3/2005 | Ma | A63H 27/10 446/220 |
| 2015/0174817 A1 | 6/2015 | Roach et al. | |

FOREIGN PATENT DOCUMENTS

| | | | | |
|---|---|---|---|---|
| DE | 202013003955 U1 * | 7/2013 | ............. | A63H 27/10 |
| WO | 8703534 A1 | 6/1987 | | |

* cited by examiner

*Primary Examiner* — Barbara J Musser
(74) *Attorney, Agent, or Firm* — Botos Churchill IP Law

(57) ABSTRACT

A method for constructing a balloon assembly includes inserting balloon envelope material which will become an apex of a balloon envelope into a platen opening of a platen; flaring the balloon envelope material outward over the top surface of the platen; positioning a termination plate over the platen opening and within the apex opening; and folding at least some of the balloon envelope that overlies the platen onto the termination plate. The balloon envelope material further includes an apex opening.

18 Claims, 16 Drawing Sheets

300

METHOD FOR SEALING THE APEX OF A BALLOON DIRECTLY TO A RIGID PLATE

CROSS-REFERENCE TO RELATED APPLICATIONS

The present application is a continuation of U.S. patent application Ser. No. 14/954,107, filed Nov. 30, 2015, now U.S. Pat. No. 9,908,607 the disclosure of which is incorporated herein by reference.

BACKGROUND OF THE INVENTION

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. As such, the balloons include a number of components, such as a flexible envelope made of material that may be configured in sections or lobes to create a "pumpkin" or lobed balloon, a plurality of tendons to support the lobes and a termination plate for securing the tendons to the balloon.

In some situations, a termination plate assembly for securing tendons to a balloon envelope may be used. The termination plate assembly may help prevent the tendons from shifting with respect to the apex of the envelope. In addition, the assembly may help transfer the hoop load from a given tendon to the opposite side of the plate. This may form a continuous loop of tensile loading that constrains pressure of the lift gas inside the balloon envelope.

Typically, the termination plate assembly may be attached to the balloon envelope before the balloon can take flight. However, the process of attaching the termination plate assembly to the balloons can become extremely time-consuming and lack consistency. Further, existing methods of attachment require making additional seals in the balloon envelope after the termination plate assembly is already attached to the balloon envelope.

BRIEF SUMMARY OF THE INVENTION

Aspects of the present disclosure relate to a method for constructing a balloon assembly. The method includes inserting a balloon envelope material which will become an apex of a balloon envelope into a platen opening of a platen, the balloon envelope material having an apex opening; flaring the balloon envelope material outward over the top surface of the platen; positioning a termination plate over the platen opening and within the apex opening; and folding at least some of the balloon envelope that overlies the platen onto the termination plate.

In one example of this method, the platen opening comprises a first circumference, the termination plate comprises a second circumference, and the second circumference is greater than the first circumference. In another example, a peripheral edge of the apex opening can be symmetrically arranged around a circumference of the termination plate. A portion of the termination plate and a portion of the balloon envelope material can be heat sealed together. In another example, the platen may further include silicone on at least a portion of a surface of the platen. In another example, the step of flaring further comprises expanding the balloon envelope at the apex opening and positioning the balloon envelope material over a top surface of the platen. In another example, the termination plate may include a circular shape. In another example, the platen opening may comprise a shape that is substantially the same shape as the termination plate. In another example, the platen opening may comprise a shape that is different than the same shape as the termination plate. IN one example, the platen may be moved away from the balloon envelope to release the balloon envelope. In another example, when the balloon envelope material is heat sealed, the termination plate and balloon envelope are fused together. In this example, prior to the balloon envelope being heat sealed, there may be no openings present between gores of the balloon envelope.

A further aspect of the disclosure provides another method of manufacturing a balloon assembly. The method includes providing balloon envelope material of a balloon envelope which will become an apex of a balloon. The balloon envelope material may have an apex opening which will form the apex, the balloon envelope material may further comprise a peripheral edge extending around a perimeter of the apex opening; and the balloon envelope material may have no openings between gores of the balloon envelope. The method may further include positioning a termination plate within the apex opening of the balloon envelope material; arranging the peripheral edge of the balloon envelope material around a circumference of the termination plate; and heat sealing the edge of the apex opening and the termination plate together.

In one example, upon completion of the heat sealing, the balloon envelope material may require no further seals to complete the balloon assembly. According to another example, the termination plate includes a circular shape. In this example, the termination plate can further include a rigid material.

A further aspect of the disclosure provides another method for constructing a balloon assembly. The method includes flaring an opening of a balloon envelope material which will become an apex of a balloon outward and over the top surface of a platen; placing a termination plate in contact with at least a portion of the balloon envelope material extending over the top surface of the platen; and folding at least some of the balloon envelope that extends over the top surface of the platen onto the termination plate.

In one example, a central portion of the terminal plate may be aligned with an opening in the platen. The balloon envelope material may be positioned within the platen, and the platen may be removed away from the balloon envelope material.

DETAILED DESCRIPTION

Figure 1:
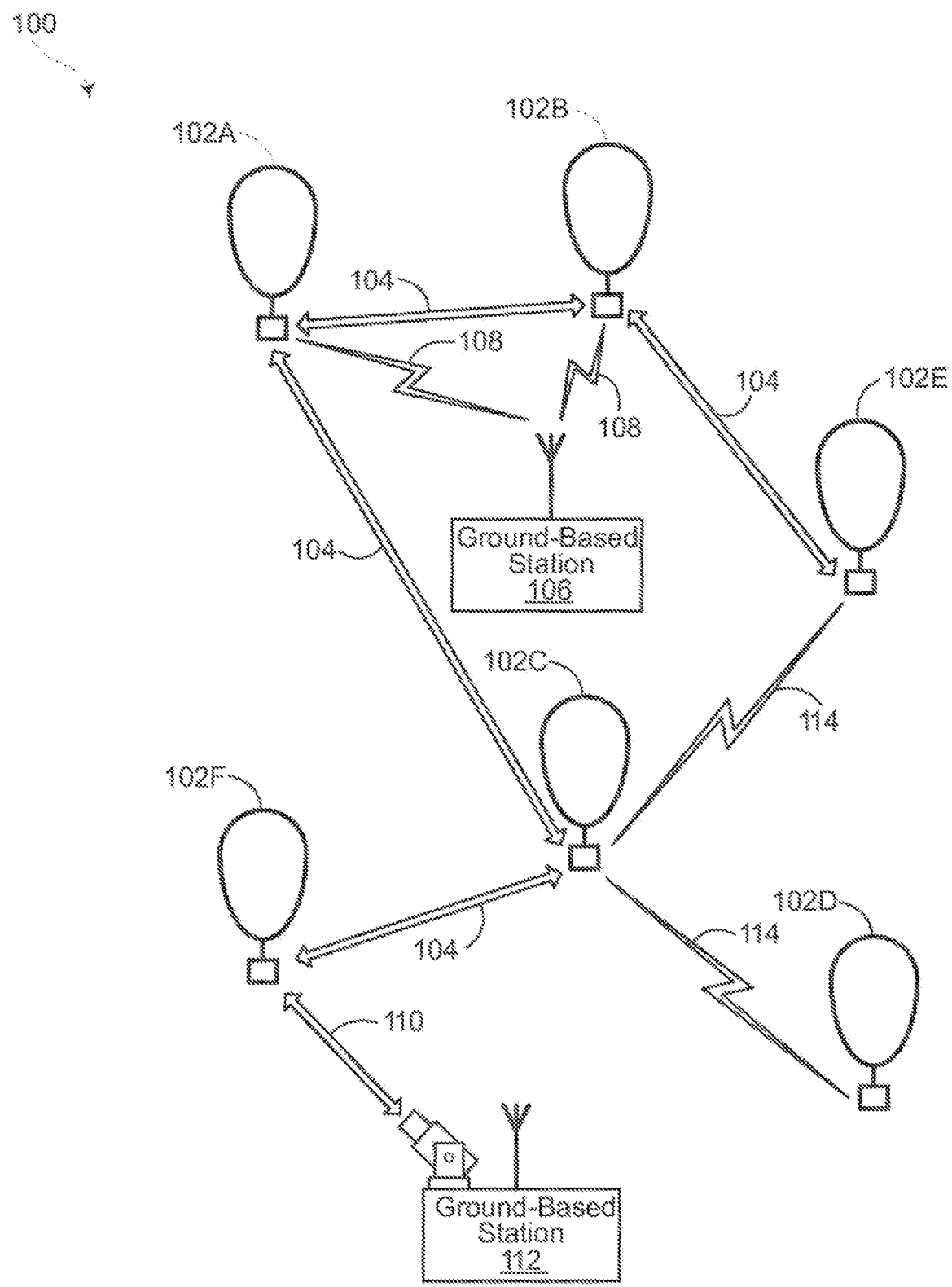
FIG. 1 is a functional diagram of a system in accordance with aspects of the present disclosure.

Aspects of the disclosure are directed to manufacturing balloon assemblies such as those used in high-altitude applications. Existing balloon manufacturing methods require attaching a termination plate to an envelope gore, inserting a platen into a lateral opening formed between the gores of a balloon envelope, draping the balloon envelope over the platen, performing an apex seal to cap the balloon, removing the platen from within the balloon envelope, and then fin sealing the opening between the gores of the balloon. The process of draping the balloon over the platen is awkward and can damage the balloon envelope. Performing the fin seal can also be complicated and lack consistency. To address this, the methods of manufacture disclosed herein provide a way in which to provide for easy assembly of a balloon assembly and can further eliminate the need for a fin seal altogether. An example method includes providing a balloon envelope material that will become an apex of a balloon and that includes an apex opening; collapsing the balloon envelope material so that the apex can be inserted through an opening in a platen; expanding the collapsed balloon envelope material at the apex opening to allow for portions of the balloon envelope to extend over the platen; inserting a base plate of a termination plate within the apex opening so as to overly the platen opening and the top surface of the platen; and then folding the balloon envelope that has been pulled through the platen opening over the top surface of the base plate of the termination plate. The balloon envelope and the base plate can then be heat sealed together. Remaining components of the termination plate assembly can be assembled to the base plate. Alternatively, one or more components of the termination plate assembly can be integrally formed together.

As discussed above, construction of a balloon according to aspects of the disclosure can include the use of a platen, a termination plate, and a balloon envelope that has an opening at its apex. The platen can be used to facilitate construction of the balloon assembly. An example platen can be a metal plate in the shape of a ring that includes an opening in a central portion of the platen. The opening can include a first circumference and include a peripheral edge that extends around the perimeter of the platen opening. The platen opening can be comprised of any shape, such as a circle, square, or the like. In one example, the opening is in the shape of a circle so as to minimize the number of edges on the platen that can potentially tear the fabric of the balloon envelope. A compliant coating, such as a compliant silicone rubber coating can be further provided on the surface of the platen to help minimize any possible damage to the balloon envelope.

The termination plate can include a rigid plastic material, such as polyethylene. Other materials or combinations thereof may also be employed. The termination plate may further include at least one surface that is planar. For example, the top surface of the termination plate may be planar to provide a surface that will allow for easy bonding of the balloon envelope to the termination plate. In other examples, the surface may vary such that portions of the termination plate to which the balloon envelope will be attached may be planar and other portions of the termination plate are not planar.

The termination plate can take on a variety of shapes and sizes. The termination plate can have a shape that is round, square, octagonal, or any custom or conventional shape. The termination plate can have a diameter and circumference that is greater than the size of the diameter and circumference of an apex opening discussed below to allow for the overall diameter of the balloon to taper towards the apex. In other examples, the termination plate can have a diameter and circumference that is the same or greater than that of the apex opening. The termination plate can be constructed as part of a termination plate assembly and further arranged so that the tendons of the balloon can be attached to the plate.

Prior to assembly, the balloon envelope material, which will form a completed balloon, may include an opening at what will become the apex of the balloon, or the apex opening. The opening can be comprised of any size opening. In one example, the opening is a six foot opening, but any size opening can be used depending upon the size of the termination plate. A peripheral edge can be formed along the perimeter of the opening. The balloon envelope material may be gathered together at what will become the apex of the balloon envelope so that gores of the envelope extend longitudinally between the apex and the remainder of the balloon envelope that falls toward the ground when the balloon is in flight.

During manufacturing of a balloon, the balloon envelope material may be threaded or pulled through the platen opening. In this example, the collapsed and gathered apex opening of the balloon envelope material is positioned below the platen. The apex can then be pulled upward through the platen opening so that a portion of the balloon envelope material is positioned on the top surface of the platen and the majority of the balloon envelope material hangs down through the opening and below the platen.

The portion of the balloon envelope material that extends through the platen opening can be expanded. For example, the apex of the balloon envelope can be flared out so that the balloon envelope material extends over the top surface of the platen and is partially supported by the platen. Flaring the balloon envelope material will allow the apex opening to expand outward such that the peripheral edge of the apex opening is folded over the platen and extends around the outer circumference of the platen. Including silicone rubber on various contact surfaces of the platen will minimize the amount of damage to these portions of the balloon envelope material that extend over the top surface of the platen.

The termination plate can be placed within the flared apex opening of the balloon envelope material and onto the platen. Since the diameter and circumference of the termination plate can be greater than the diameter and circumference of the platen opening, the peripheral edge of the termination plate will rest on the top surface of the platen as well as the balloon envelope material. In some examples, the circumference and diameter of the termination plate may be greater than the circumference of the opening of the platen, but smaller than the overall diameter and circumference of the platen. This will allow for a portion of the balloon envelope material overlying the platen to remain uncovered by the termination plate.

The portion of the balloon envelope material that extends through the platen opening can be pulled up and folded over the peripheral edge of the plate. For example, the peripheral edge of the apex opening can be arranged on the plate so that the peripheral edge of the apex opening is arranged symmetrically around the plate. The peripheral edge of the apex opening of the balloon envelope material can be arranged so that opposed edges of the apex opening do not contact one another and are spaced apart from one another. In such example, a portion of the termination plate can form the uppermost portion of the apex of the balloon and remain exposed. The exposed portion of the plate can be in the shape of a circle, although any desired shape can be accomplished.

The balloon envelope material can be heat sealed to the plate. A heat sealer can be used to heat seal a portion of the balloon envelope, including the peripheral edge of the balloon envelope, to the plate. To prevent movement of the balloon envelope during the heat sealing process, weights such as sand bags may be used to hold down peripheral portions of the balloon envelope that overlie a top surface of the platen, but do not extend over the termination plate. This method of assembly allows for the termination plate to function as a mandrel and the platen to serve as a support for the mandrel.

The remaining components of the termination plate assembly can be assembled to the termination plate to complete the termination plate assembly. For example, the load rings, tendons and other components of the termination plate assembly can be attached to the termination plate. In other examples, one or more additional components of the termination plate assembly can be assembled with the termination plate prior to the balloon envelope material being sealed to the termination plate. In still other examples, the termination plate assembly may be completed prior to attachment of the balloon envelope material to the termination plate assembly.

At any stage of assembly after the balloon envelope material and plate are heat sealed together, the assembly of the balloon envelope material and termination plate can be removed from the platen. In one example, the platen can be separated into two parts and opened to allow for removal of the heat sealed balloon envelope and termination plate. Such a platen may include a hinge at a point along the circumference of the opening to allow the platen to be opened along the hinge. Other methods of removal are also contemplated.

In an alternative method, the balloon envelope material is not threaded through an opening in the platen. Instead, a device such as an elongated pole can be inserted through the length the balloon envelope material. One end of the elongated pole can be inserted into an opening in a stand or fixture positioned toward the ground. The other end of the elongated pole can be attached to a platen having a continuous planar surface. The platen can have a second circumference that is greater than the circumference of the termination plate. The termination plate can be further constructed and arranged so that it is capable of being gripped from the top of the plate, such as through the use of suction. The peripheral edge of the apex opening can then be arranged along the peripheral edge of the plate. Again, weights such as sand bags can be used to support the portions of the balloon envelope material that do not extend over the plate and are supported by the platen. A heat sealer can be used to form a seal between the plate and the balloon envelope material.

Example System

FIG. 1 depicts an example system 100 in which a balloon assembled according to aspects herein may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
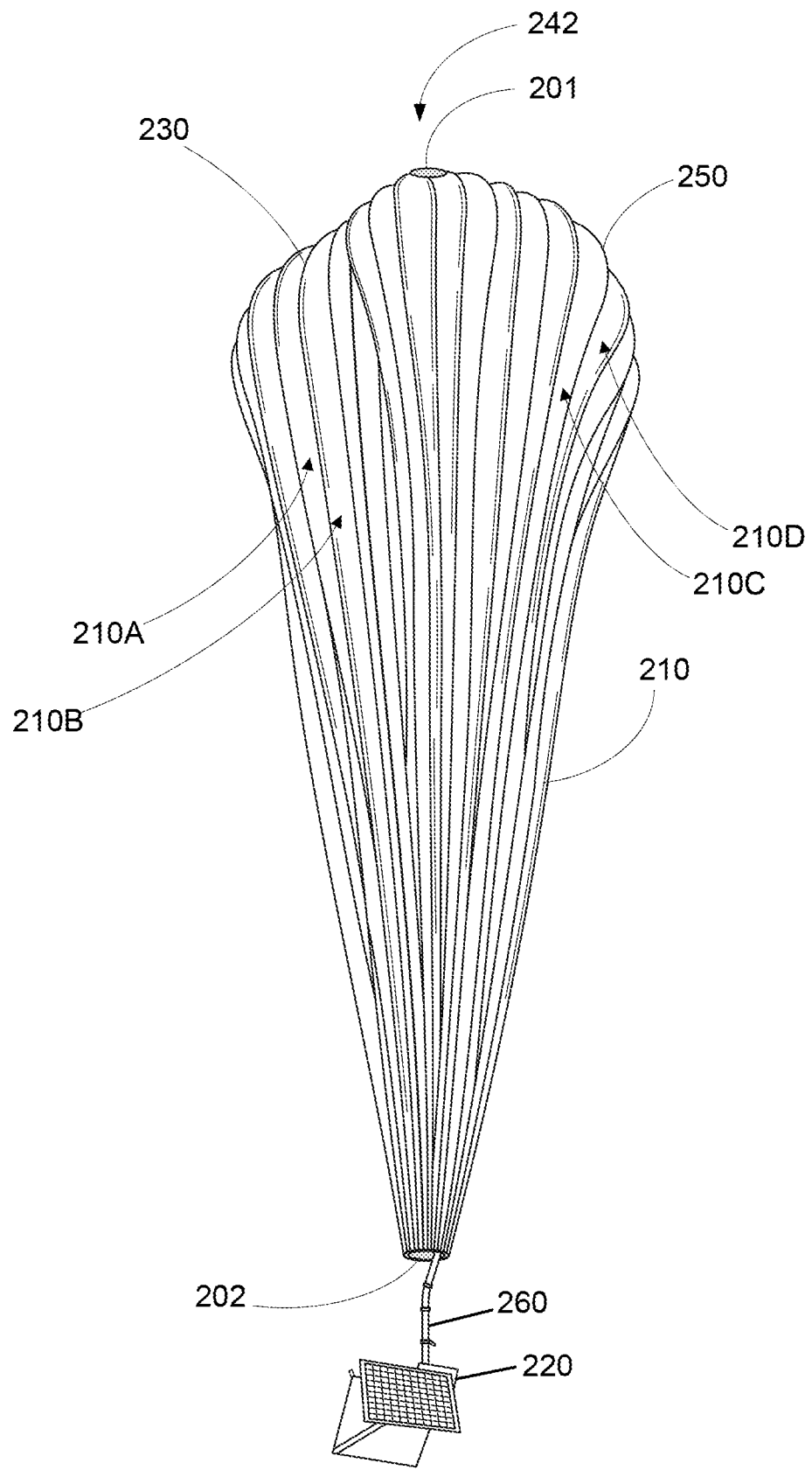
FIG. 2 is a view of an example of a balloon in accordance with aspects of the present disclosure.

FIG. 2 is an example balloon 200, which may represent any of the balloons of balloon network 100. As shown, the balloon 200 includes a balloon envelope 210 comprised of envelope gores 210A, 210B, 210C, 210D, a payload 220 and a plurality of tendons 230 attached to the envelope 210 and a termination plate 201 at the apex 242 of the balloon.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-than-air gas. The envelope 210 is thus arranged to have an associated upward buoyancy force during deployment of the payload 220.

The payload 220 of balloon 200 is affixed to the envelope by a connection such as a cable (not shown). The payload 220 may include a computer system (not shown), having one or more processors and on-board data storage. The payload 220 may also include various other types of equipment and systems (not shown). For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of a plurality of envelope gores 210A-210D.

Pressurized lift gas within the balloon envelope 210 may cause a force or load to be applied to the balloon 200. In that regard, the tendons 230 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Each tendon may be formed as a fiber load tape that is adhered to a respective envelope gore. Alternately, a tubular sleeve may be adhered to the respective envelopes with the tendon positioned within the tubular sleeve. In some examples, the tendons 230 may be run from the apex to the bottom of the balloon envelope 210 in order to pick up the load. In normal operations, these tendons 230 need to be kept in place during balloon flight in order to continue to handle the load and maintain the shape of the balloon envelope.

Top ends of the tendons 230 may be coupled together using a type of assembly, such as a termination plate assembly 201, which may be positioned at the apex of balloon envelope 210. In some examples, bottom ends of the tendons 230 may also be connected to one another. For example, a corresponding termination plate 202 may be disposed at a base or bottom of the balloon envelope 210. The termination plate 201 at the apex may be the same size and shape as the plate 202 at the bottom of the envelope 210. Both termination plates may include corresponding components for attaching the tendons 230 thereto. In other examples, the mouth of the bottom of the envelope 210 may remain open during use, such that the mouth is not sealed to a termination plate or other device.

Figure 3A:
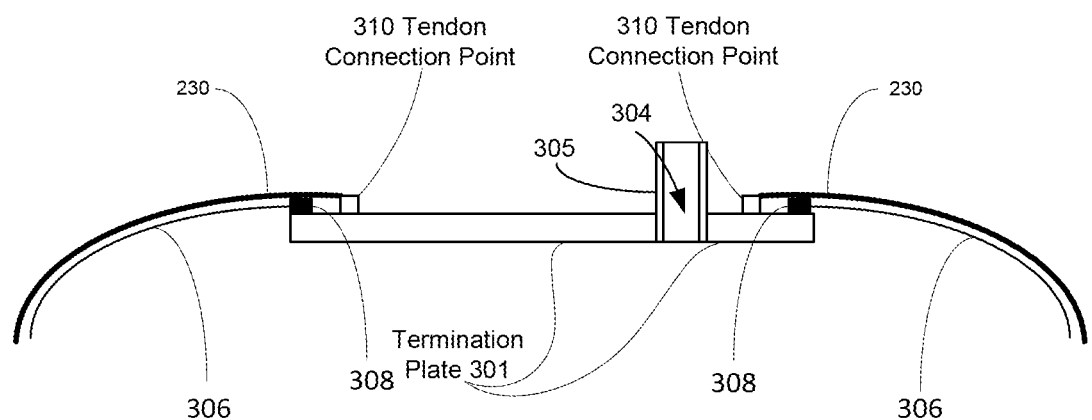
FIG. 3A is a cross-sectional view of an example of a termination plate assembly in accordance with aspects of the present disclosure.

FIG. 3A is an example of a termination plate assembly 300 corresponding to termination plate assembly 201. Here, a side cut-a-way view of the termination plate assembly 300 is shown. In this example, the termination plate assembly 300 includes a number of components, such as a termination plate 301, that are attached to balloon envelope material 306 of the balloon envelope 210 at heat bond locations 308. The termination plate may also include one or more openings for filling the balloon envelope 210 with lift gas such as fill port 304. A plurality of tendons 230 may be attached to the termination plate 301 at various tendon connection points 310. In some examples, a tube 305 may be attached to the fill port 304 in order to fill the balloon envelope with lift gas. In other examples, the termination plate assembly 300 may include less features, additional features, or alternative features.

The termination plate 301 may be made of a lightweight yet rigid material, such as a type of plastic or other types of similar materials. Because the termination plate 301 may not itself be load bearing, the termination plate assembly 300 may include a load bearing mechanism for supporting the tendons attached to the assembly. Although not shown, the termination plate assembly 300 may include a load ring or cable that can be coupled to each tendon at the various tendon connection points 310 in order to secure that tendon to the assembly 300.

Figure 3B:
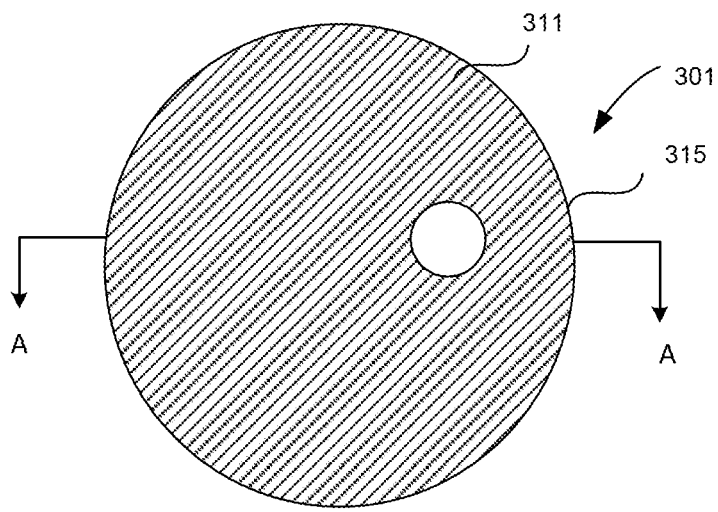
FIG. 3B is a top plan view of an example termination plate of the termination plate shown in FIG. 3.
Figure 3C:
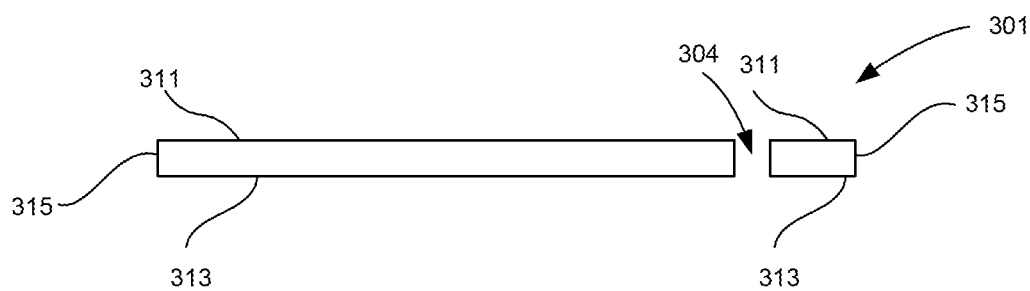
FIG. 3C is a cross-sectional view of the termination plate of FIG. 3B taken across line A-A.

As illustrated in FIG. 3B, a top-down view of the termination plate and FIG. 3C, a cross-sectional view of the termination plate 3B taken along line B-B, the termination plate 301 can include a substantially planar top surface 311, bottom surface 313, and a peripheral edge 315. Balloon envelope material 306 can be attached to the top surface 311, such as through use of heat bonds at heat bond locations 308 (FIG. 3A). Various techniques can be employed for applying the heat bonds to seal together portions of the termination plate 301 to the balloon envelope material 306. In other examples, only a portion of the termination plate 301 may include a planar surface to allow for attachment of balloon envelope material 306, but other portions of the top surface 311 and/or bottom surface 313 may not be planar. In still other examples, termination plate 301 may be made of a plurality of plate members (not shown) such as a base configured for attachment to the balloon envelope material and body configured for attachment to the tendons which may be joined to one another using heat bonds or other connection methods.

Example Method of Assembly

Figure 4A:
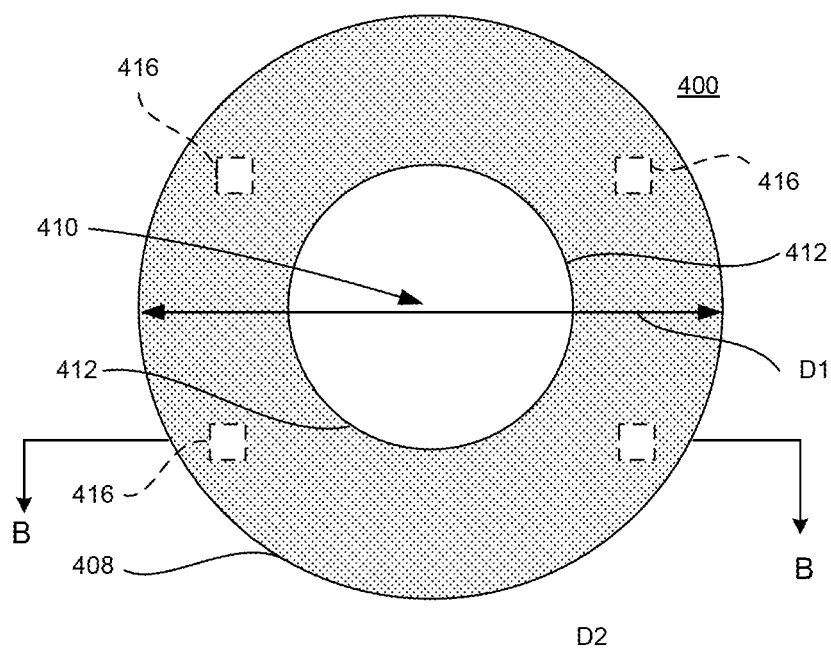
FIG. 4A is a top view of an example platen according to aspects of the disclosure.
Figure 4B:
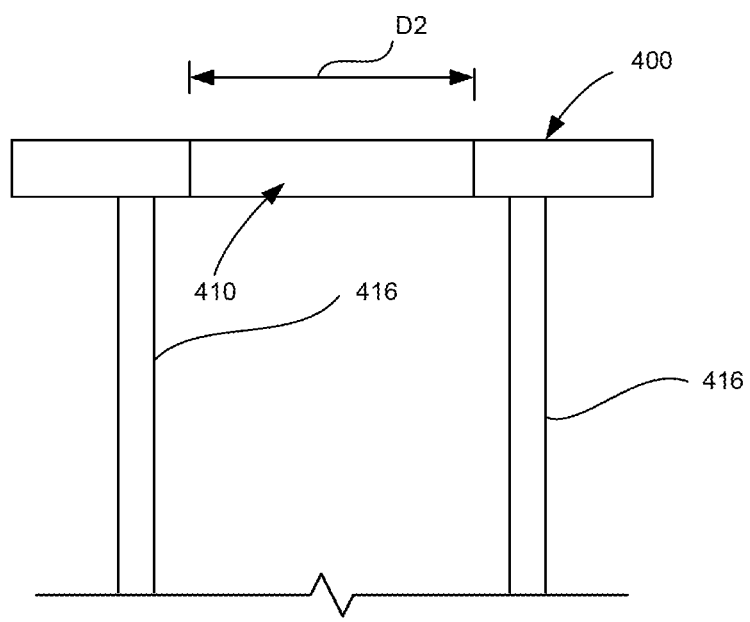
FIG. 4B is a cross-sectional view of the platen of FIG. 4A taken across line B-B.

As discussed above, construction of a balloon according to aspects of the disclosure can include the use of a platen, a balloon envelope that has an opening at its apex, and a termination plate of a termination plate assembly to which the balloon envelope is attached. With reference to FIGS. 4A and 4B, a platen assembly 400 can be used to facilitate construction of the balloon assembly, including supporting the balloon envelope during assembly and functioning as a mandrel during attachment of the balloon envelope material 306 to termination plate 301. Platen assembly 400 may include a platen 402 and a support structure, discussed below, that supports the platen 402. The platen 402 may be comprised of a rigid material capable of withstanding the extremely high temperatures of the heat sealing process, such as a metal. Other materials or combinations thereof may also be used. Platen 402 may be in the overall shape of a circular ring. The platen 402 may have a diameter D1 and an outer peripheral edge 408. D1 may range from 300-600 mm, but a platen that has a diameter that is less than 300 or greater than 600 mm may also be utilized. The diameter D1 of the platen 402 can be larger than the diameter of the sealing band.

An opening 410 may be provided at a central portion of the platen 402. The opening 410 can include a diameter D2 (shown in FIG. 4B) and include a peripheral edge 412 that extends around the perimeter of the platen opening 410. In some examples, the platen opening 410 may have a diameter D2 ranging from 200-400 mm. In other examples, the platen opening 410 may have a diameter D2 that is less than 200 mm or greater than 400 mm. The diameter D2 of the platen 402 can be smaller than the diameter of the sealing band so that the sealing band can be supported by the platen 402.

The platen opening 410 can be comprised of any shape, such as a circle, square, or the like. In one example, the opening 410 is in the shape of a circle, as shown in FIGS. 4A and 4B) so as to minimize the number of edges on the platen 402 that can potentially tear the fabric of the balloon envelope. The outer circumference of the platen 402 may also be comprised of any shape. As shown, the outer circumference of the platen 402 may be circular to complement the circular shape of the opening or vice versa. The outer circumference of the platen 402 may be the same as the shape of the platen opening 410 or may differ from the shape of the platen opening 410. A compliant coating, such as a compliant silicone rubber coating can be further provided on one or more surfaces of the platen 402 to help minimize any possible damage to balloon envelope material.

The platen 402 can be supported by a support structure. In one example, legs 416 shown in FIG. 4B may form the support structure and be positioned along the circumference of the platen 402. In another example, the legs may be slightly curved so as to complement the contour of the platen 402. In still other examples, platen 402 may not include its own underlying structure and may instead be clamped to another working surface, such as a table or work bench.

Figure 5:
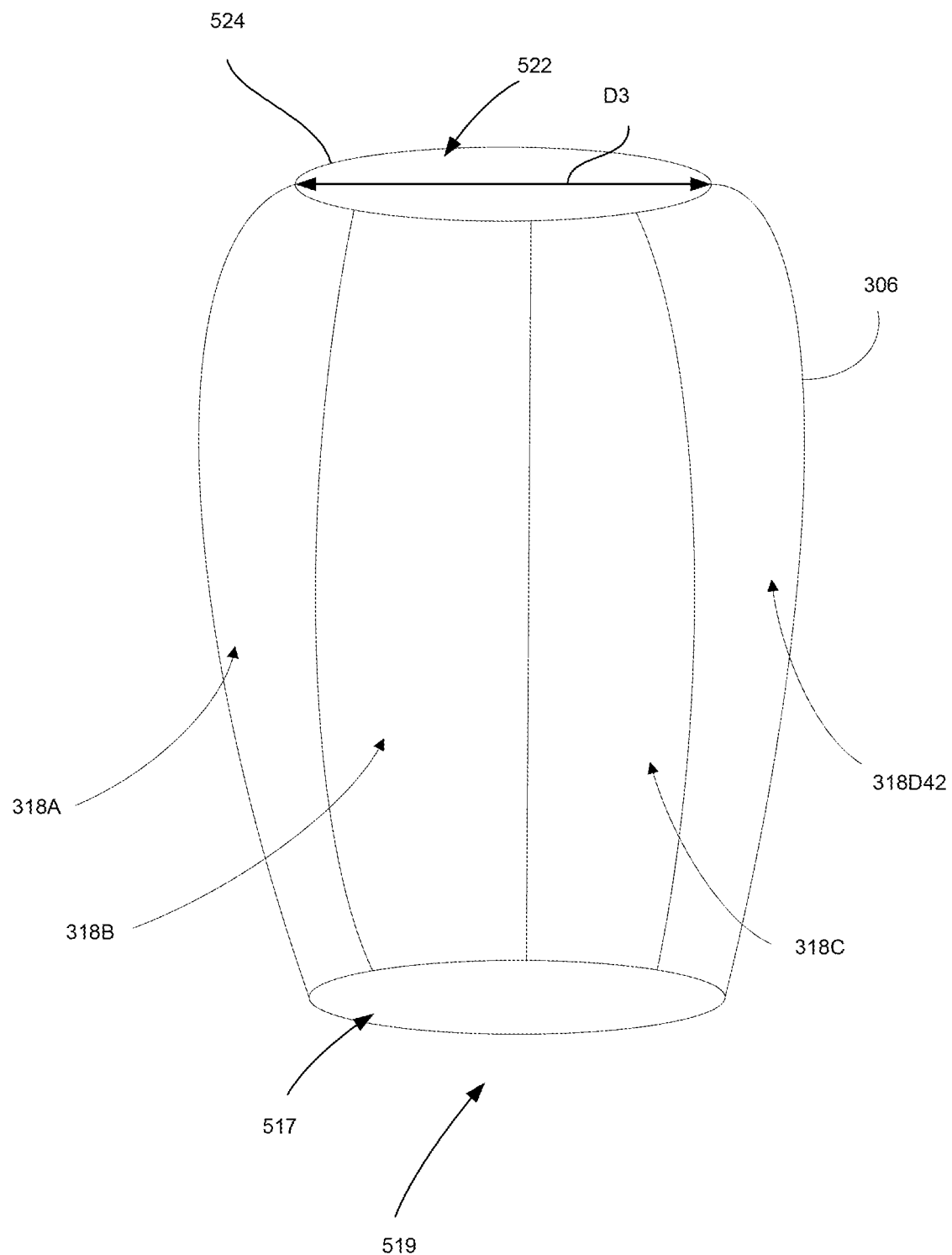
FIG. 5 is an example balloon envelope material according to aspects of the disclosure.

As shown in FIG. 5, prior to assembly, the balloon envelope material 306, which will form a completed balloon envelope 210, may include an apex opening 522 at what will become the apex 242 (FIG. 2) of the assembled balloon. In one example, the apex opening 522 may be circular in shape and form a full 360 degrees when the opening is expanded. The apex of the balloon envelope 210 can be comprised of any shape, such as circular, rectangular and the like. As an example, the full diameter D3 of the apex opening 522 can be six feet, but an apex opening 522 having a diameter that is greater than six feet or less than six feet can also be used. A peripheral edge 524 of apex opening 522 can be formed along the perimeter of the apex opening 522. There may also be an opening 517 at the mouth 519 of the bottom of the balloon envelope material 306. Prior to assembly, the balloon envelope material 420 may be gathered together at what will become the apex of the balloon envelope so that gores of the envelope extend longitudinally between the apex and the remainder of the balloon envelope that falls toward the ground when the balloon is in flight. In this example, there are no openings between the gores 318A, 318B, 318C, 318D of the balloon envelope 306. The only openings in the balloon that will require sealing can be present at the apex opening 522 of the balloon envelope material 306, as well as the mouth 517 at the balloon bottom 519. In other examples, mouth 517 of the balloon may be sealed prior to assembling the apex opening with the termination plate, such that the apex opening 522 is the only opening that will require sealing once the balloon envelope 306 is attached to the termination plate.

Figure 6A:
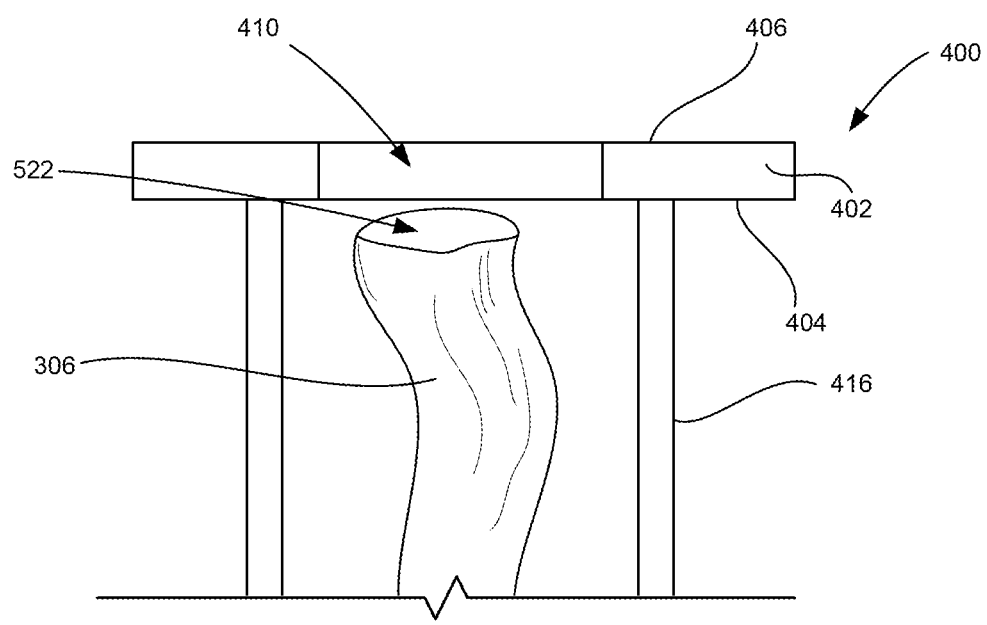
FIGS. 6A-6G illustrate a method of assembling a balloon according to aspects of the disclosure.
Figure 6B:
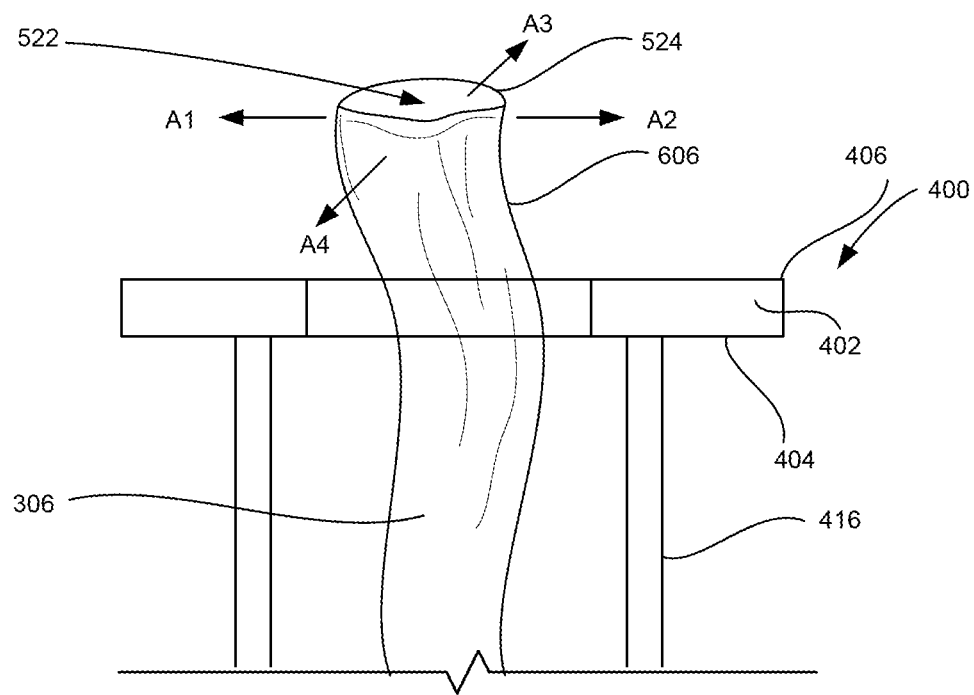

Assembly of the balloon will be discussed with regard to FIGS. 6A-6G. During manufacturing of a balloon, the balloon envelope material 306 may be threaded or pulled through the platen opening 410. Referring to FIG. 6A, balloon envelope material is collapsed and gathered. The balloon envelope material 306 can be initially collapsed and gathered at the apex opening 522 of the balloon envelope material 306. The collapsed and gathered apex opening 522 of the balloon envelope material 306 is shown positioned below the bottom surface 404 of the platen 402 and between the legs 416 of the platen assembly 400. The balloon envelope material 306 that will form the apex of the balloon can be aligned with the platen opening 410. As shown in FIG. 6B, portions 606 of the balloon envelope material 306 can be pulled or threaded through the platen opening 410 so that the balloon envelope material 606 forming at least a portion of the apex opening 522 of the balloon envelope material 306 extends above the top surface 406 of the platen 402. The remainder and majority of the balloon envelope material 306 hangs down through the platen opening 410 and below the bottom surface 404 of the platen 402.

Figure 6C:
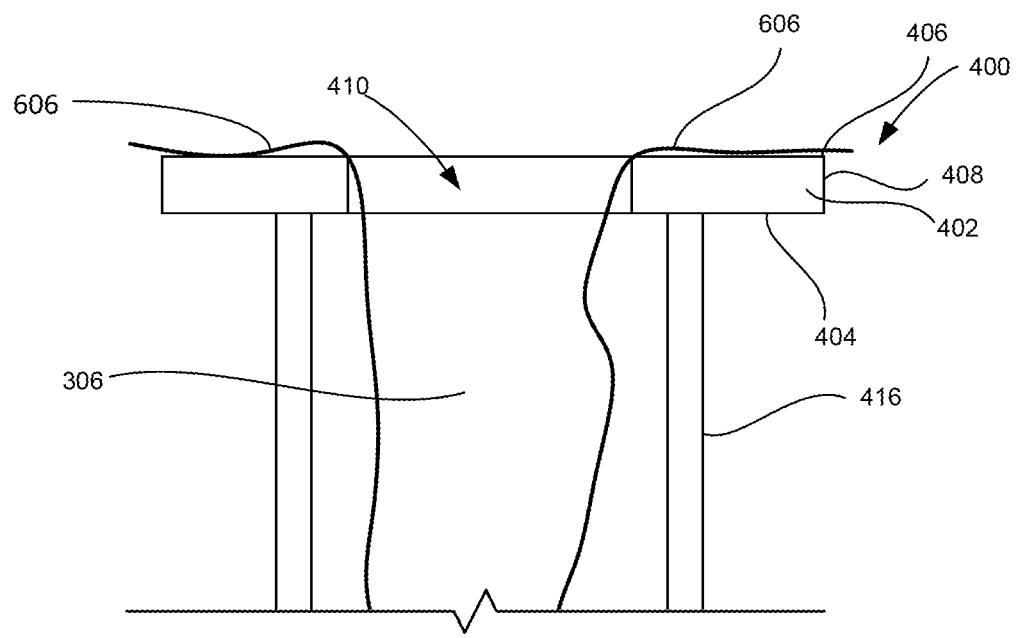
Figure 6D:
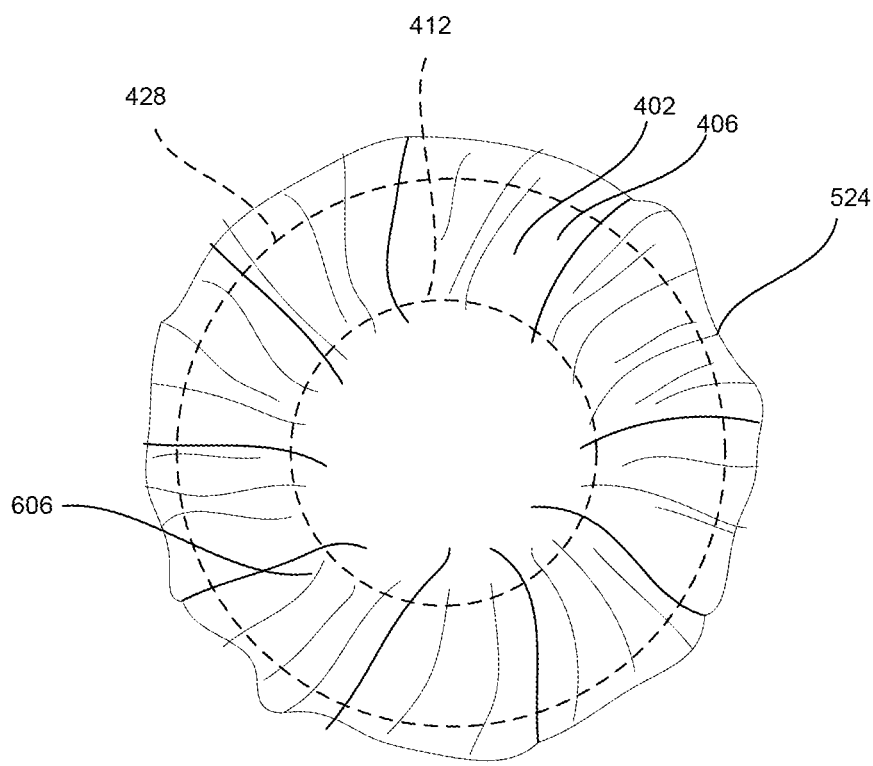

The portions of the balloon envelope material 606 that extends through the platen opening 410 can be expanded. For instance, portions of the balloon envelope material 606 that will form apex of the balloon envelope material 306 can be flared outward so that the portions of the balloon envelope material 606 expands from its collapsed or gathered state to an expanded state. In one example, opposed ends of the peripheral edge 524 of apex opening 522 can be pulled outward in at least respective and opposite directions A1 and A2, as well as A3 and A4. When the opposed ends of the peripheral edge 524 of apex opening 522 of the balloon envelope material 306 are pulled apart, the balloon envelope material 306 can extend over the top surface 406 of the platen 402 and is partially supported by the platen 402, as shown in FIG. 6C. Although not shown, the portions of balloon envelope material 606 may also extend over and along the edge 408 of the of platen opening. Flaring the portions of the balloon envelope material 606 at the apex opening 522 can allow the apex opening 522 to expand outwardly such that the peripheral edge 524 of the apex opening 522 extends across the top surface 406 of the platen 402 and around the outer circumference of the platen 402, as shown in FIG. 6D. FIG. 6D is a top down view of the platen assembly 400 and flared portions of the balloon envelope material 606 of FIG. 6C. As noted above, in some examples, silicone rubber coating (not shown) can be provided on various contact surfaces of the platen 402 to minimize the amount of damage to the portions of the balloon envelope material 606 that extend over the top surface 406 of the platen 402.

Figure 6E:
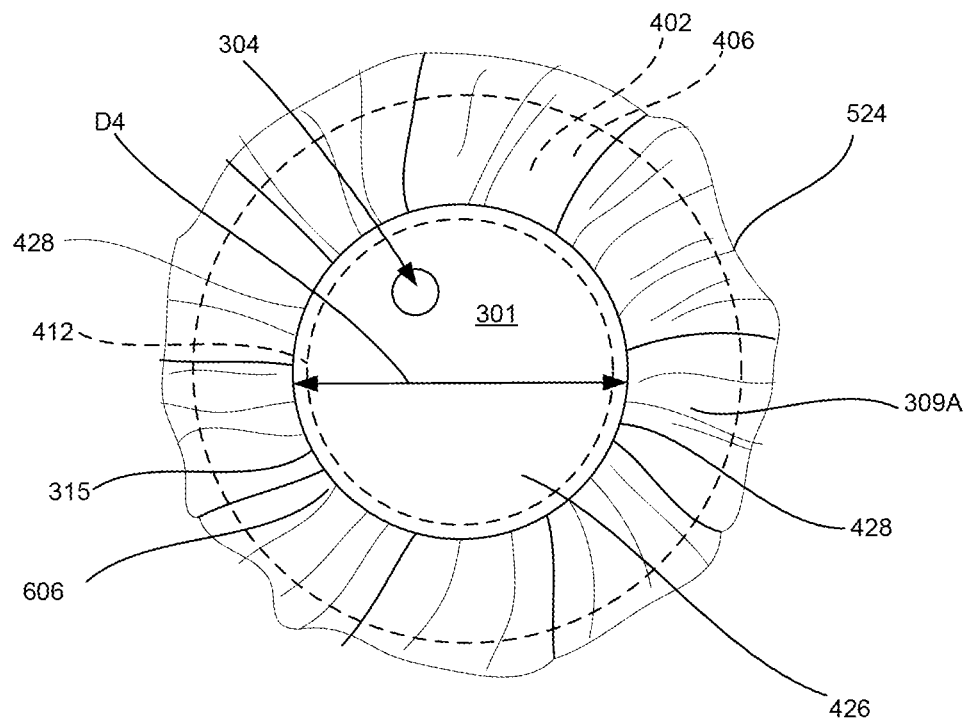

The termination plate 301 of the termination plate assembly 300 can be placed within the flared apex opening 522 of the balloon envelope material and onto the platen 402. As shown in the example of FIG. 6E, termination plate 301 may be provided directly on top of the balloon envelope material 306 that will form the apex 242 of the balloon, as well as the top surface 406 of the platen 402. The diameter D4 of the termination plate 301 is greater than the diameter D2 (see FIG. 4B) of the platen opening 410. In this arrangement, the peripheral edge 315 of the termination plate 301 will extend beyond the peripheral edge 412 of the platen opening 410 and overlie the top surface 406 of the platen 402, as well as the balloon envelope material 306 that will form the apex of the balloon. This will allow for a portion of the balloon envelope material 306 overlying the platen 402 to overlie the top surface 406 of the platen 402, but remain uncovered by the termination plate 301.

As noted above, the termination plate 301 can take on a variety of shapes and sizes. The termination plate 301 can have a shape that is round, square, octagonal, or any custom or conventional shape. The termination plate 301 can have a diameter and circumference that is less than the size of the diameter and circumference of an apex opening 522 discussed above to allow for the overall diameter of the balloon to taper towards the apex. In other examples, the termination plate 301 can have a diameter and circumference that is the same or greater than that of the apex opening 522.

Figure 6F:
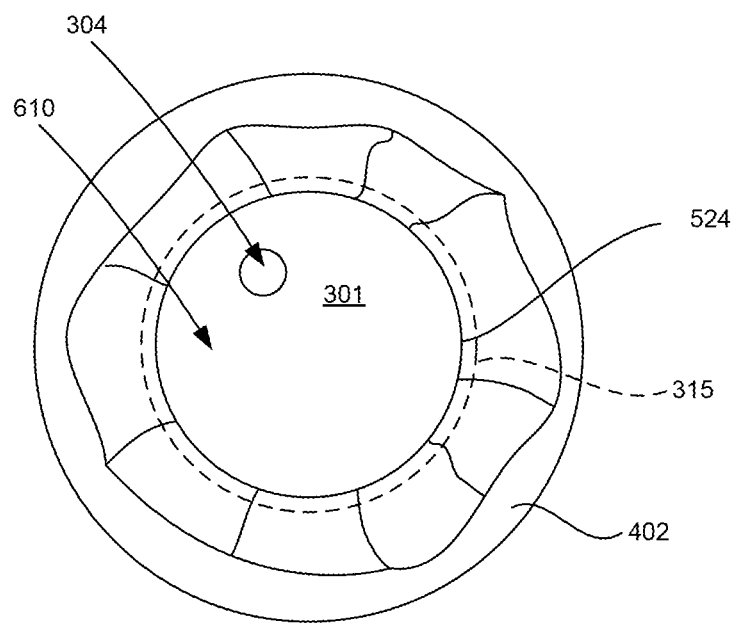
Figure 6G:
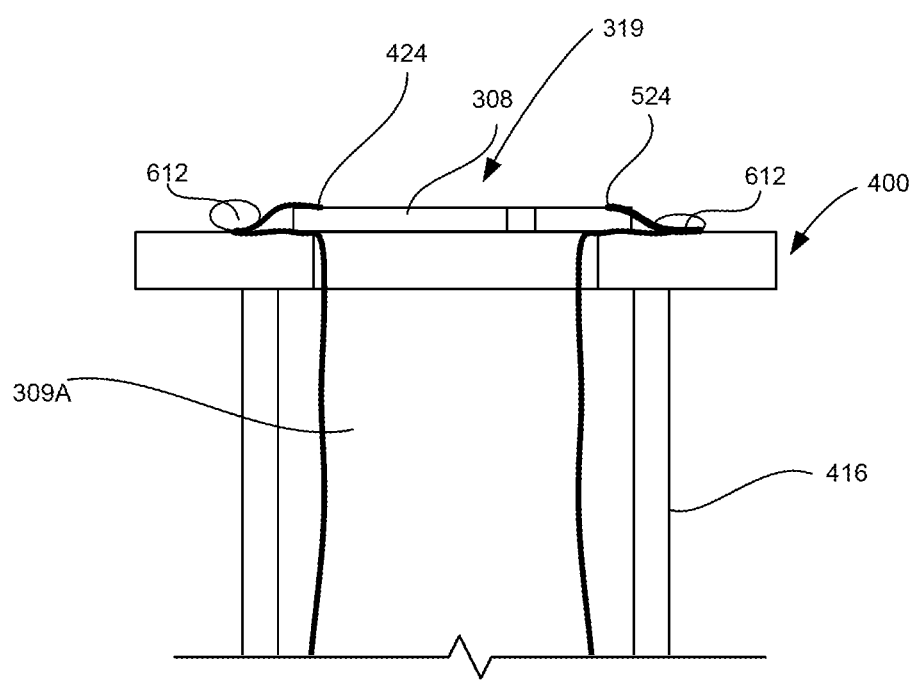

The portions of the balloon envelope material 606 that extend through the platen opening 410 can be folded up and positioned over the peripheral edge 315 of the termination plate 301. As shown in FIGS. 6F-6G, the peripheral edge 524 of the apex opening 522 of the balloon envelope material 306 may be pulled up and folded up over the peripheral edge 315 of the termination plate 301 so that the peripheral edge 524 of the apex opening 522 of the balloon envelope material 306 is arranged symmetrically around the termination plate 301. The peripheral edge 524 of apex opening 522 of the balloon material 306 forming the apex opening 522 can be arranged so that opposed edges of the apex opening 522 of the balloon envelope material 306 do not contact one another and are spaced apart from one another. In such example, a portion 319 of the termination plate 301 can remain exposed. Due to the arrangement of the balloon envelope material 306 around the termination plate 301, the exposed portion 610 of the termination plate 301 can be circular in shape, although any desired shape can be accomplished by arranging the peripheral edge 524 of the balloon envelope material 306 in a different configuration.

FIG. 6G illustrates a cross-sectional view of the peripheral edge 524 of the apex opening 522 of the portions of the balloon envelope material 606 folded over the edge of the termination plate 301 prior to the envelope being attached or secured to the termination plate 301. Objects 612, such as sandbags, may be provided on top of the balloon envelope material 306 that extends beyond the termination plate and onto the platen 402. These objects can hold the balloon envelope material 306 in place during the heat sealing process and while any additional components, tendon connection points 310 and tendons 306, of the termination plate assembly 300 may be assembled together as needed. The balloon envelope material 306 can be sealed to the termination plate 301 by various means, such as by using a heat bond as discussed above. Once in place, as shown in FIG. 6G, a heat sealer or circular press can be used to heat seal the portions of the balloon envelope material 606, including heat sealing the peripheral edge 424 of the apex opening 522 of the balloon envelope material 306, to the termination plate 301.

Figure 7A:
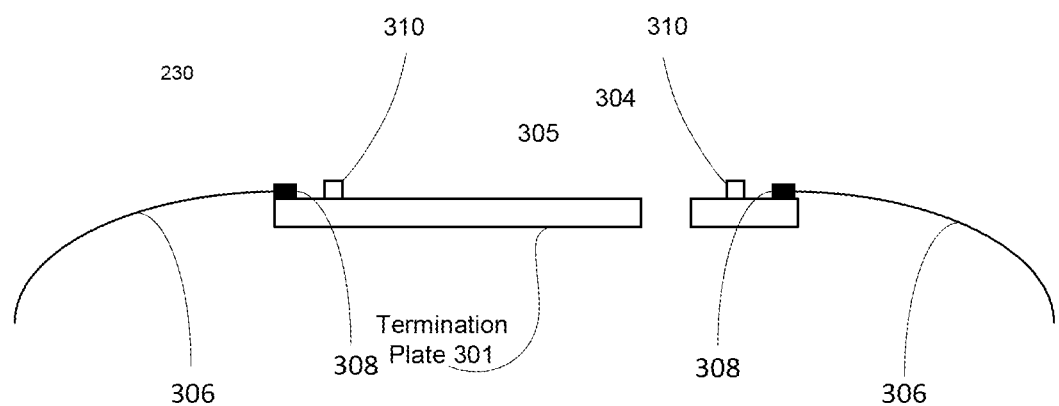
FIGS. 7A-7C illustrate additional features of assembling a balloon according to aspects of the disclosure.
Figure 7B:
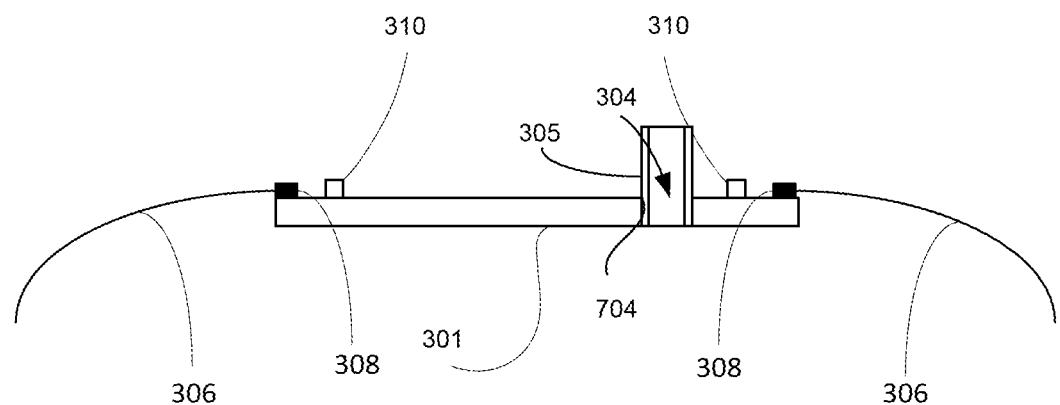
Figure 7C:
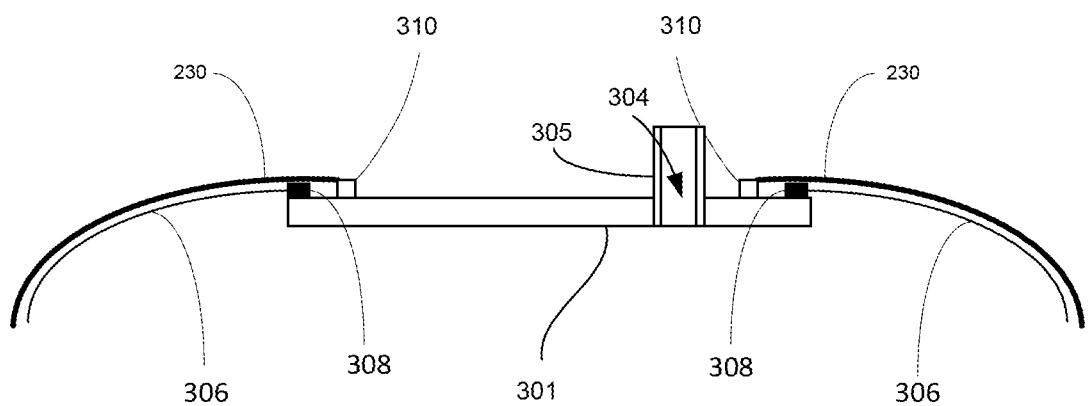

When the balloon envelope material 306 is sealed to the termination plate 301, any remaining components of the termination plate assembly 300, such as tendon connection points 310 and tendons 306 (see FIG. 3) can be assembled to the termination plate 301. In one example, completion of the termination plate assembly 300 can occur while the balloon envelope 306 remains positioned on the platen 402. Alternatively, the heat sealed balloon envelope material 306 and termination plate 301 can be removed from the platen 402 and moved to a different structure to allow for further assembly of the termination plate assembly. In another example, the components of the termination plate assembly 300 are partially or fully assembled together with the termination plate 301 prior to the heat sealing FIGS. 7A-7D illustrate one example where the termination plate assembly 300 is completed after the balloon envelope material 306 is sealed to the termination plate 301 and while the balloon envelope material 306 and termination plate 301 are supported by the platen assembly 400. Turning first to FIG. 7A, the tendon connection points 310 can be attached to the termination plate 301. As an example, a load ring can be attached, for example, by a number of screws riveted through pre-configured openings in brackets used for holding the load ring to the termination plate 301. FIG. 7B illustrates a fill tube 305 being attached to the fill port 304 at attachment point 704. By way of example, an impulse weld, various kinds of glue, or other similar techniques can be used to secure the fill tube 305 to the fill port 304. A plurality of tendons, such as tendons 306, may then be coupled to the termination plate 310, for example, by attaching each tendon to the tendon connection points 310. These tendon connection points 310 may be configured for holding the tendons 306 in place on the balloon envelope material 306, as shown in FIG. 7C.

The assembled balloon envelope material 306 and termination plate 301 can be removed from the platen 402 of the platen assembly 400 at any point after the balloon envelope 306 and base plate 308 are heat sealed together. For example, when the balloon envelope material 306 and termination plate 301 are attached together, the assembly can be removed from the platen 402 and transferred to another mechanism to complete assembly of the termination plate assembly. In another example, the platen 402 is separated away from the assembled components of the termination plate assembly 300 and balloon envelope material 306 prior to attachment of the tendons to the load ring.

The balloon envelope material 306 and termination plate 301 can be removed from the platen 402 of the platen assembly 400 using various methods. In one example, the platen 402 can be separated into two parts and opened to allow for removal of the heat sealed balloon envelope material 306 and termination plate 301. Such a platen 402 may be comprised of two components mechanically joined together. In one example, the platen may include a hinge at a point along the circumference of the opening to allow the platen 402 to be opened along the hinge. Alternatively or additionally, one component of the platen may include a tab and the second component may include an opening adapted to receive the tab. Other devices for allowing connection and temporary removal of the platen components are contemplated. Additionally or alternative methods of removing the assembled balloon envelope material 306 and base plate 308 and/or completed termination plate assembly 300 from the platen 402 may also be used. In one example, the completed assembly is pulled through the platen opening 410.

Figure 8A:
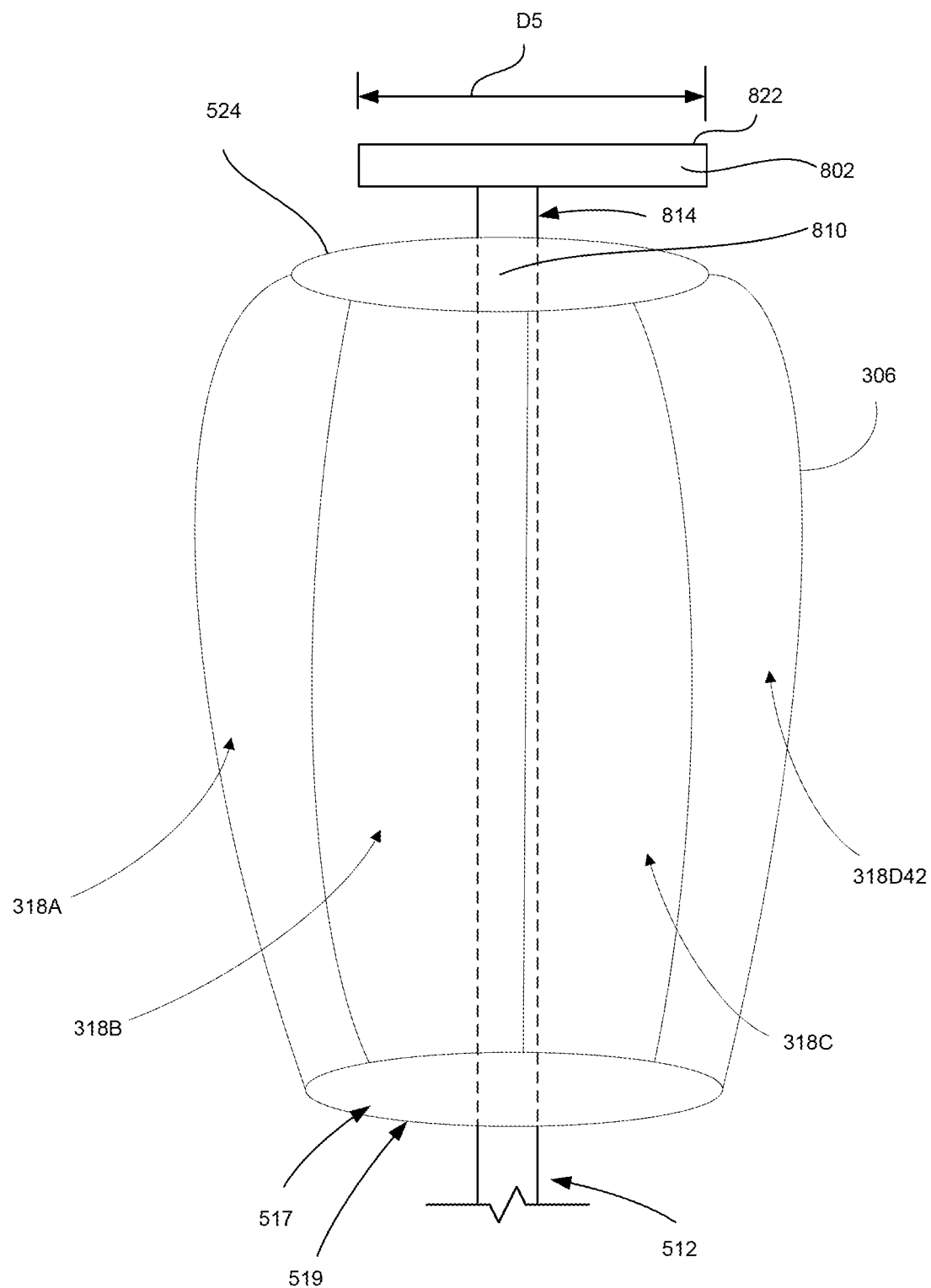
FIGS. 8A-8C illustrate an alternative method of assembling a balloon according to aspects of the disclosure.
Figure 8B:
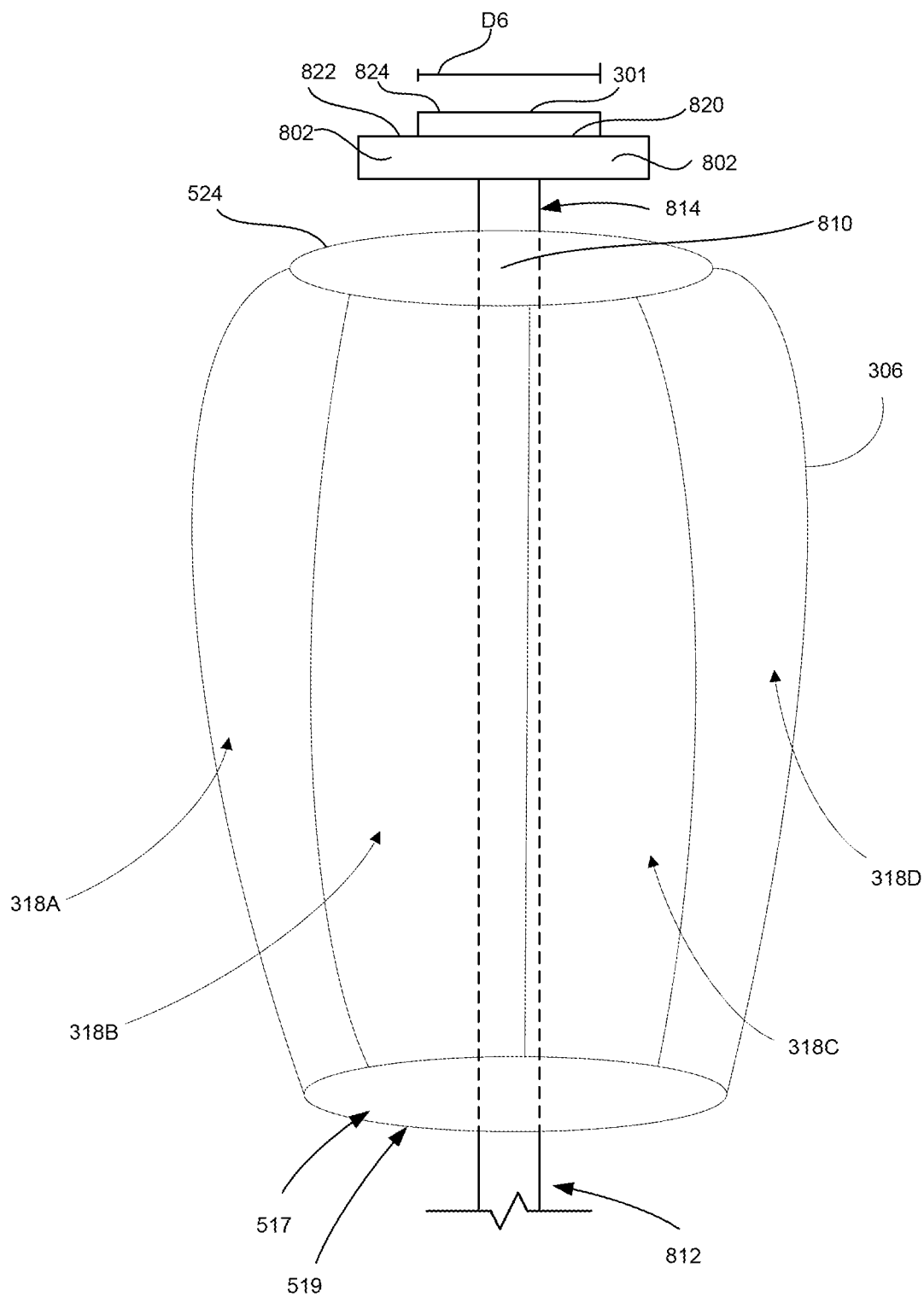
Figure 8C:
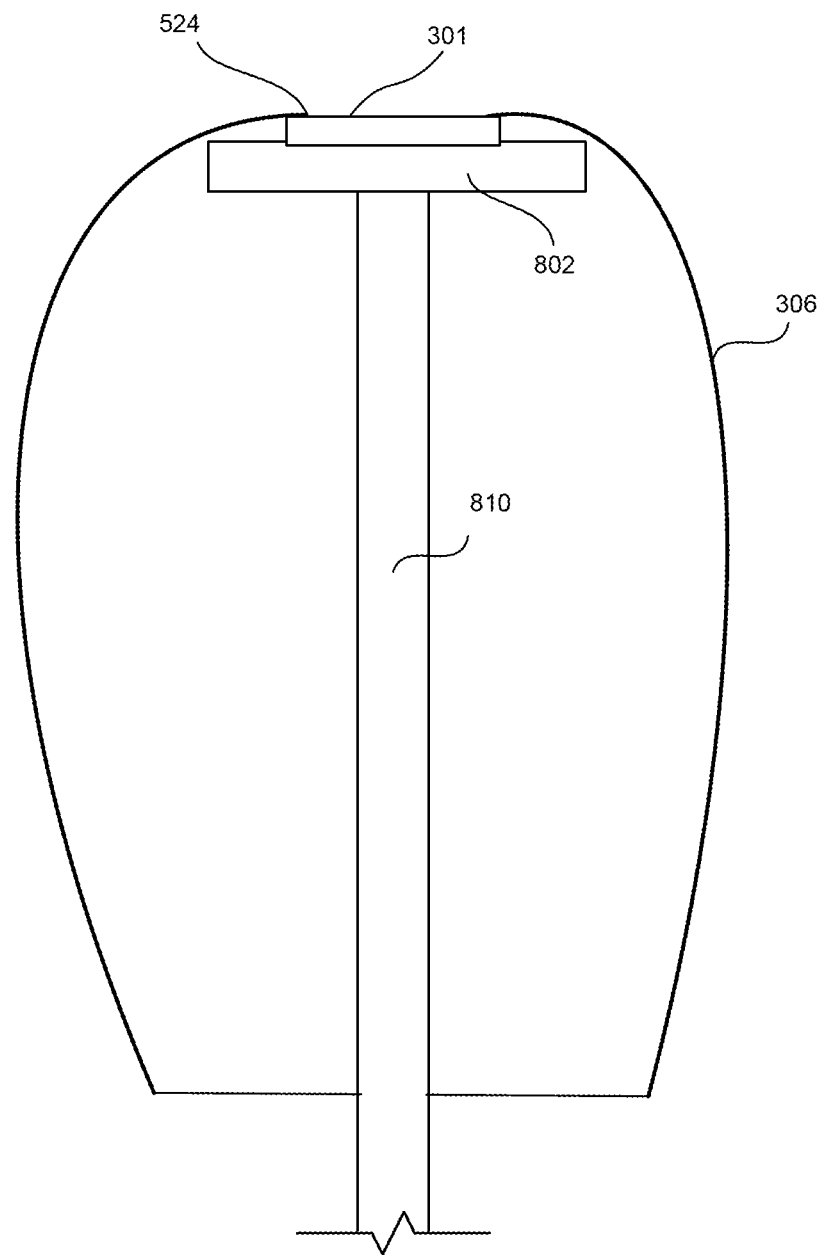

An alternative method of assembling the balloon envelope and termination plate is disclosed in FIGS. 8A-8C. Instead of threading the balloon envelope material 306 through an opening in a platen 402, a device such as an elongated pole 810 can be inserted through the length the balloon envelope material 306, such as for example through the apex opening of the balloon envelope material 306 and mouth 517 of the bottom opening 519, as shown in FIG. 8A. One end 812 of the elongated pole 810 can be inserted into an opening in a stand or fixture positioned toward the ground. The other end 814 of the elongated pole 810 can be attached to a platen 802. Platen 802 can have a continuous planar top surface 822. Alternatively, the pole 810 and platen 802 can be first positioned. The balloon envelope material can be flared open at the apex opening and the mouth 517 and then placed over the pole 810 and platen 802.

Termination plate 301 can be placed onto the platen 802, as shown in FIG. 8B.

The platen 802 can have a diameter D5 that is greater than the diameter D6 of the termination plate 301. The termination plate 301 can be temporarily secured to the platen 802 through various methods, such as through use of suction that secures the bottom surface 313 of the termination plate 301 to the top surface 822 of the platen 802. In other examples, the top surface 311 of the termination plate 301 may be secured to a device overlying the termination plate 301.

As shown in FIG. 8C, a cross-sectional view of the balloon envelope 306, pole 810, platen 802, and termination plate 301, the peripheral edge 526 of the apex opening of the balloon envelope 306 can then be pulled up and over the termination plate. Again, objects (not shown), such as sand bags, can be used to support the portions of the balloon envelope material that do not extend over the termination plate 301 and are supported by the platen 802. A heat sealer can be used to form a seal between the plate and the balloon envelope material 306. Additional components forming a termination plate assembly, if any, can also be assembled together with the termination plate to form the completed termination plate assembly.

The assembled balloon envelope material 306 and termination plate 301 can be moved away from the platen after the termination plate assembly is completed. In one example, the remainder of the balloon envelope can be gathered from the bottom and pulled up and over the termination plate and platen. In another example where the termination plate 301 is secured by suction or other device overlying the termination plate, the device can lift the termination plate 301 and balloon envelope away from the platen 802.

Figure 9:
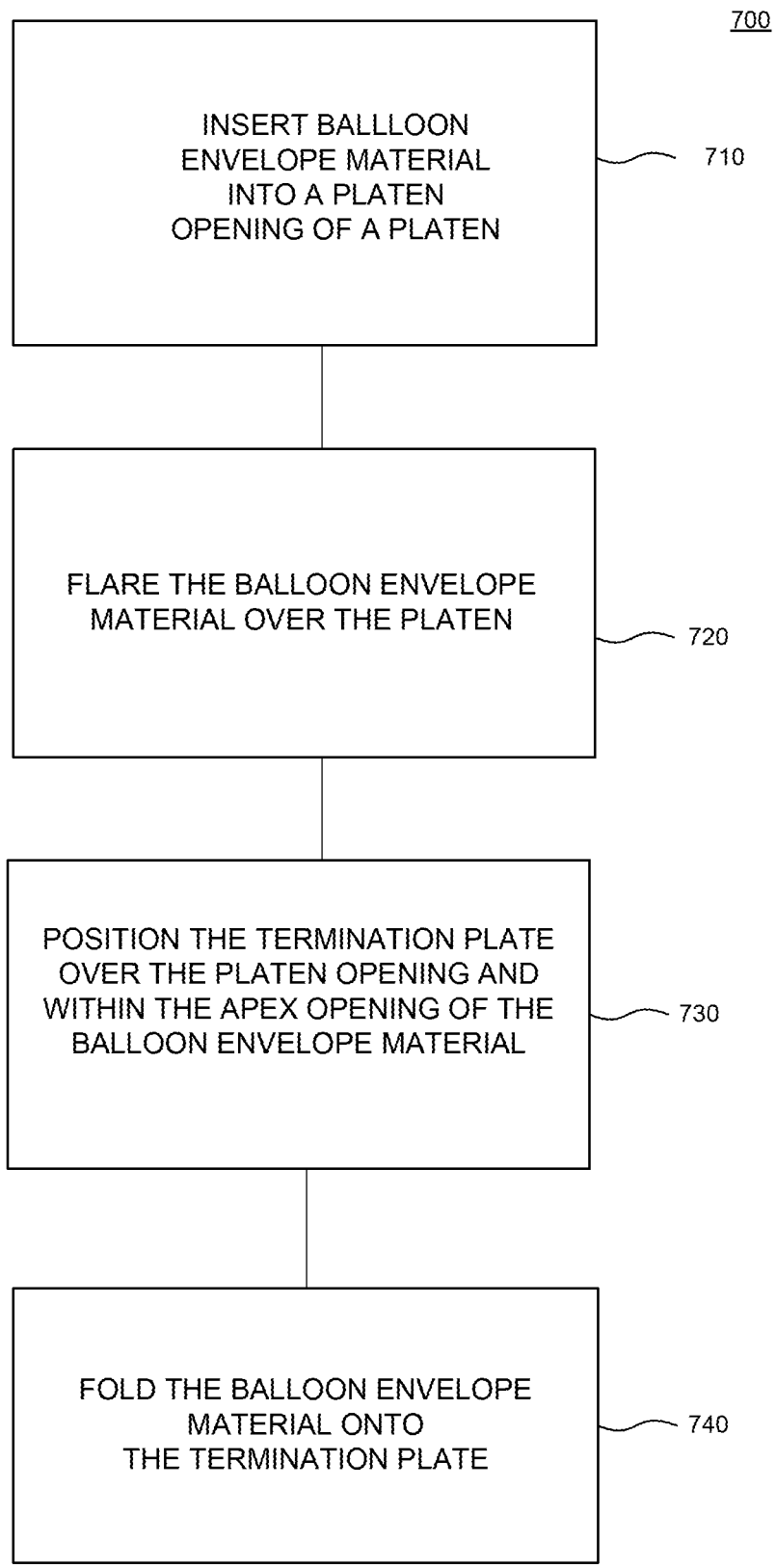
FIG. 9 illustrates method steps of assembling a balloon according to aspects of the disclosure.

FIG. 9 illustrates an example method 700 of assembling a balloon according to aspects of the disclosure. At block 710, a balloon envelope material is inserted into a platen opening of a platen. In one example, the balloon envelope material which will become an apex of a balloon envelope is inserted through the platen opening. Alternatively, the bottom of the balloon envelope material can be inserted through the platen opening so that the balloon envelope material that will become an apex of the balloon envelope overlies a top surface of the platen and the remainder of the balloon envelope material falls below the top surface of the platen. The balloon envelope material can be flared outward over the top surface of the platen at block 720. For example, the peripheral edges of the balloon envelope material that will become the apex of the balloon envelope can be pulled apart from one another. The termination plate can be positioned over the platen opening and within the apex opening of the balloon envelope material at block 730. At least some of the balloon envelope that overlies the platen can be folded onto the termination plate at block 730. In one example, the balloon envelope material can be extended over the top surface of the termination plate such that the balloon envelope material extends over the peripheral edge of the balloon envelope and onto the top surface of the termination plate.

Figure 10:
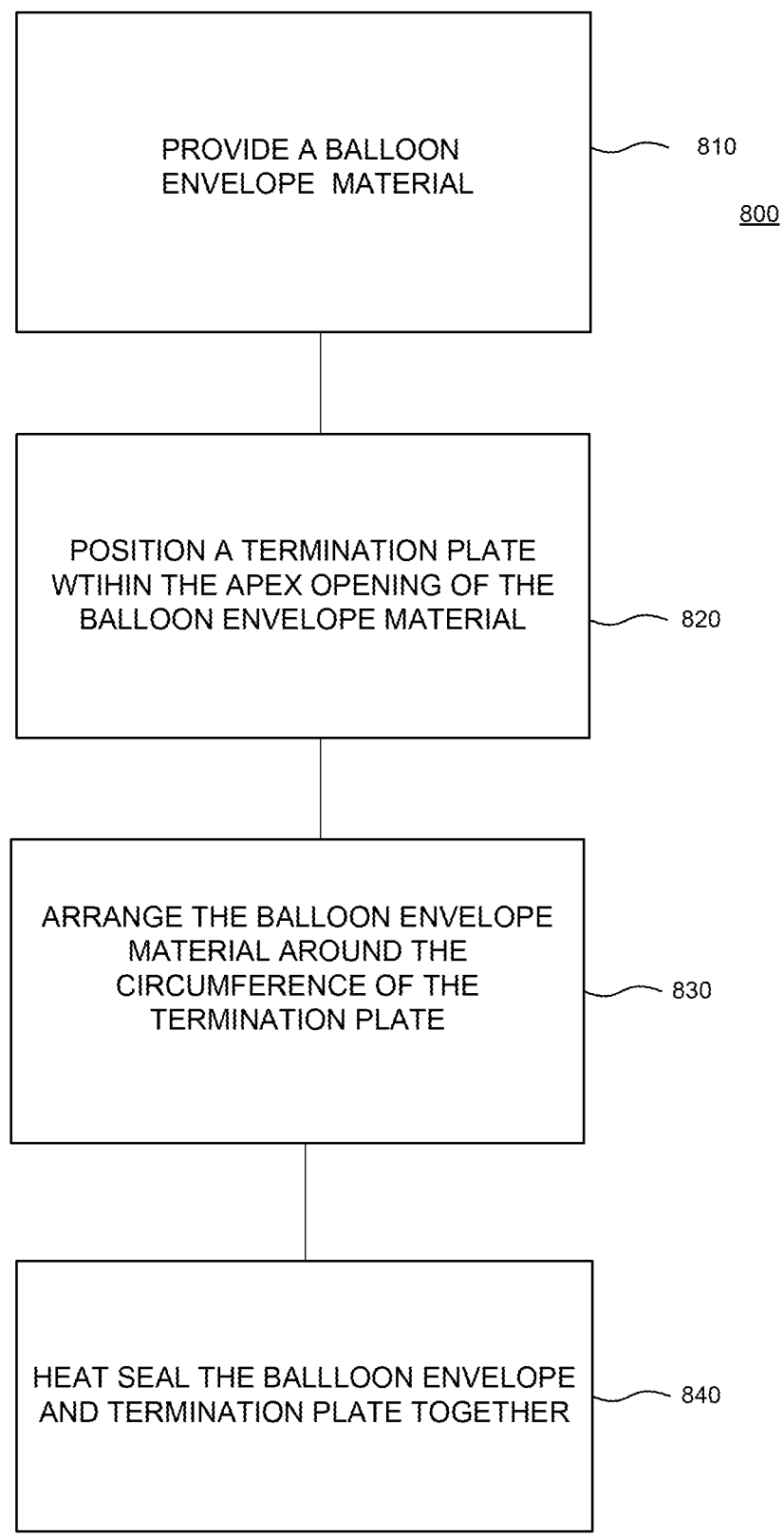
FIG. 10 illustrates method steps of assembling a balloon according to aspects of the disclosure.

FIG. 10 illustrates another example method 800 of assembling a balloon according to aspects of the disclosure. At block 810, balloon envelope material is provided which will become an apex of a balloon. The balloon envelope material includes an apex opening which will form the apex of the balloon. The balloon envelope material further includes a peripheral edge that extends around a perimeter of the apex opening. The balloon envelope material includes having no openings between gores of the balloon. At block 820, a termination plate can be positioned over the platen opening and within the apex opening of the balloon envelope material. At block 830, the balloon envelope material is arranged around the circumference of the termination plate. For example, the peripheral edge of the balloon envelope material is arranged around a circumference of the termination plate. The peripheral edge of the apex opening and the termination plate can be heat sealed together at block 840.

Figure 11:
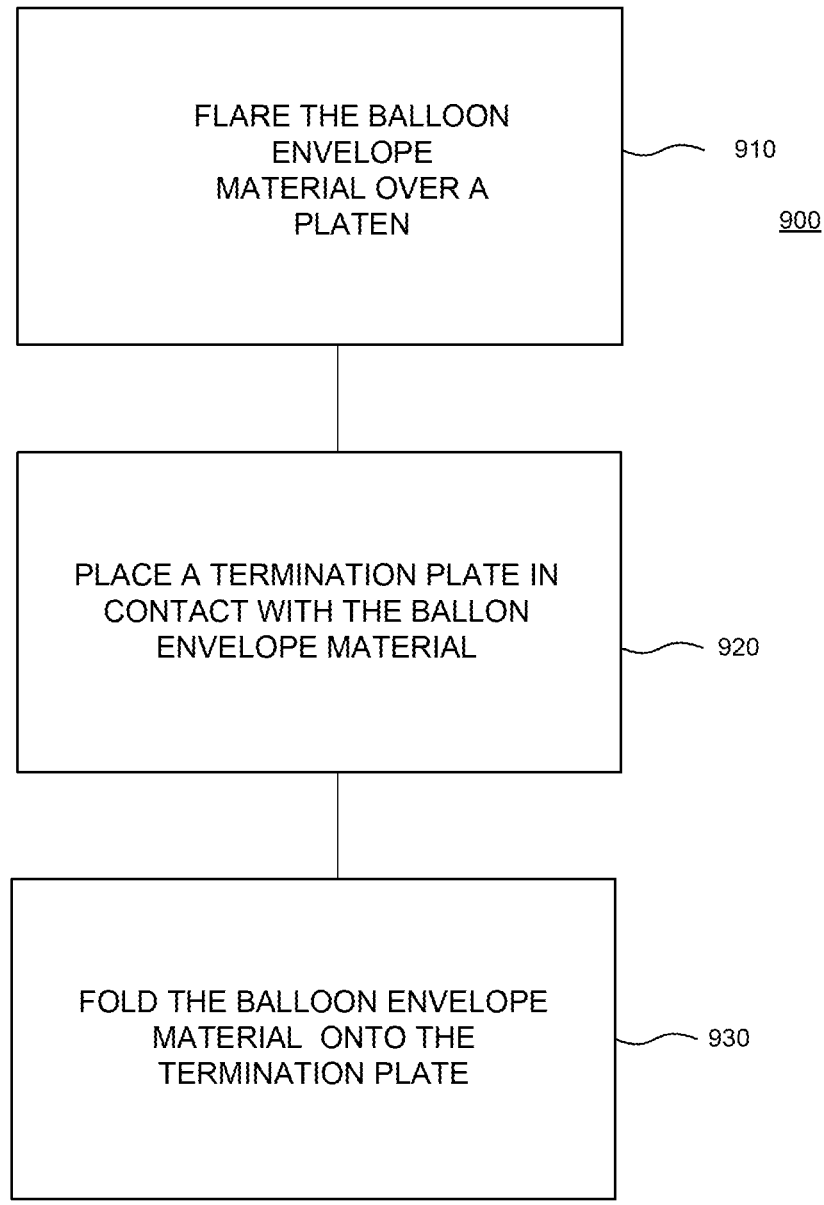
FIG. 11 illustrates method steps of assembling a balloon according to aspects of the disclosure.

FIG. 11 illustrates another example method 900 of assembling a balloon according to aspects of the disclosure. At block 910, a balloon envelope material which will become an apex of a balloon can be flared outward and over the top surface of a platen. For example, the peripheral edge of the apex opening of the balloon envelope material can be pulled apart to increase the size of the apex opening. A termination plate can be placed into contact with at least a portion of the balloon envelope material extending over the top surface of the platen at block 920. At least some of the balloon envelope that extends over the top surface of the platen can be folded onto the termination plate at block 930.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments.

The invention claimed is:

1. A method for constructing a balloon assembly comprising:

inserting balloon envelope material of a balloon envelope into a platen opening of a platen, the balloon envelope material having an opening;

positioning a termination feature, including a termination plate of the balloon assembly, over the platen opening and onto the balloon envelope material; and heat sealing the termination feature to the balloon envelope material.

2. The method of claim 1, further comprising folding at least some of the balloon envelope that overlies the platen onto the termination feature.

3. The method of claim 1, wherein heat sealing includes sealing a peripheral edge of the opening in the balloon envelope material and the termination feature together.

4. The method of claim 1, wherein the platen further includes silicone on at least a portion of a surface of the platen, and wherein the heat sealing is performed at the surface.

5. The method of claim 1, wherein the termination feature includes a circular shape.

6. The method of claim 1, wherein the platen opening comprises a first circumference, the termination feature comprises a second circumference, and the second circumference is greater than the first circumference such that the termination feature is positioned over an entire area of the platen opening.

7. The method of claim 1, wherein the platen opening comprises a first circumference, the termination feature comprises a second circumference, and the second circumference is less than the first circumference such that the termination feature is positioned within an area of the platen opening.

8. The method of claim 1, further comprising arranging a peripheral edge of the opening in the balloon envelope material around a circumference of the termination feature prior to attaching the termination feature.

9. The method of claim 1, wherein the platen opening comprises a shape that is substantially the same shape as the termination feature.

10. The method of claim 1, wherein the platen opening comprises a shape that is different than the termination feature.

11. The method of claim 1, further comprising, after attaching the termination feature, removing the balloon envelope from the platen.

12. The method of claim 1, wherein prior to the termination feature being attached, there are no openings between gores of the balloon envelope.

13. The method of claim 1, further comprising aligning a central portion of the termination feature with the platen opening prior to attaching the termination feature.

14. The method of claim 1, further comprising flaring the balloon envelope material outward over a top surface of the platen prior to attaching the termination feature.

15. The method of claim 14, wherein the termination feature is attached to the flared balloon envelope material.

16. The method of claim 1, further comprising gathering the balloon envelope material at the opening in order to insert the balloon envelope material into the platen.

17. The method of claim 16, wherein the balloon envelope material is inserted into the platen opening from below the platen, and wherein positioning the termination feature includes placing the termination feature above the platen.

18. The method of claim 17, wherein inserting the balloon envelope material includes allowing part of the balloon envelope material to hang down through the platen opening and below a bottom surface of the platen.

* * * * *